United States Patent
Chotai et al.

(10) Patent No.: US 7,761,110 B2
(45) Date of Patent: Jul. 20, 2010

(54) FLOOR CONTROL TEMPLATES FOR USE IN PUSH-TO-TALK APPLICATIONS

(75) Inventors: Ashish Chotai, Santa Clara, CA (US); Sravan Vadlakonda, Sunnyvale, CA (US); Binh Don Ha, Fremont, CA (US); Aseem Asthana, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 11/443,894

(22) Filed: May 31, 2006

(65) Prior Publication Data
US 2007/0281723 A1 Dec. 6, 2007

(51) Int. Cl.
*H04B 7/00* (2006.01)
(52) U.S. Cl. .............. 455/519; 370/230; 455/414.1; 455/510
(58) Field of Classification Search .............. 455/404.1, 455/414.1, 414.3, 507, 509, 510, 512, 518; 370/236, 230, 282
See application file for complete search history.

(56) References Cited

U.S. PATENT DOCUMENTS

| | | | |
|---|---|---|---|
| 4,805,210 A | 2/1989 | Griffith, Jr. | |
| 5,206,905 A | 4/1993 | Lee et al. | |
| 5,220,599 A | 6/1993 | Sasano et al. | |
| 5,341,413 A | 8/1994 | Hori et al. | |
| 5,369,783 A * | 11/1994 | Childress et al. | 455/17 |
| 5,402,490 A | 3/1995 | Mihm, Jr. | |
| 5,432,844 A | 7/1995 | Core et al. | |
| 5,568,540 A | 10/1996 | Greco et al. | |
| 5,608,786 A | 3/1997 | Gordon | |
| 5,615,213 A | 3/1997 | Griefer | |
| 5,794,218 A | 8/1998 | Jennings et al. | |
| 5,905,448 A | 5/1999 | Briancon et al. | |
| 5,937,040 A | 8/1999 | Wrede et al. | |
| 5,974,142 A | 10/1999 | Heer et al. | |
| 5,999,599 A | 12/1999 | Shaffer et al. | |
| 6,044,081 A | 3/2000 | Bell et al. | |
| 6,259,405 B1 | 7/2001 | Stewart et al. | |

(Continued)

OTHER PUBLICATIONS

How to Build Smart Appliances, Albercht Schmidt, Kristof Van Laerhoven, IEEE Personal Communications, Aug. 2001, pp. 66-71.

*Primary Examiner*—Edward Urban
*Assistant Examiner*—Christian A Hannon
(74) *Attorney, Agent, or Firm*—The Law Offices of Bradley J. Bereznak

(57) ABSTRACT

A processor-implemented method of operation for managing a push-to-talk (PTT) session involving a plurality of participants includes applying a first floor control algorithm at a PTT server. The first floor control algorithm being selected from a plurality of algorithms that arbitrate among talk requests received from the participants. The method further includes changing, during the PTT session, from the first floor control algorithm to a second floor control algorithm at the PPT server. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

30 Claims, 4 Drawing Sheets

U.S. PATENT DOCUMENTS

| | | |
|---|---|---|
| 6,271,764 B1 | 8/2001 | Okamura |
| 6,366,651 B1 | 4/2002 | Griffith et al. |
| 6,373,817 B1 | 4/2002 | Kung et al. |
| 6,421,544 B1 | 7/2002 | Sawada |
| 6,438,600 B1 | 8/2002 | Greenfield et al. |
| 6,522,726 B1 | 2/2003 | Hunt et al. |
| 6,526,293 B1 | 2/2003 | Matsuo |
| 6,542,586 B1 | 4/2003 | Helstab |
| 6,545,596 B1 | 4/2003 | Moon |
| 6,564,261 B1 | 5/2003 | Gudjonsson et al. |
| 6,587,680 B1 | 7/2003 | Ala-Laurila |
| 6,643,774 B1 | 11/2003 | McGarvey |
| 6,654,455 B1 | 11/2003 | Isaka |
| 6,665,534 B1 | 12/2003 | Conklin et al. |
| 6,721,401 B2 | 4/2004 | Lee et al. |
| 6,738,461 B2 | 5/2004 | Trandal et al. |
| 6,766,007 B1 | 7/2004 | Dermler et al. |
| 6,769,000 B1 | 7/2004 | Akhtar et al. |
| 6,771,639 B1 | 8/2004 | Holden |
| 6,792,296 B1 | 9/2004 | Van Bosch |
| 6,792,297 B2 | 9/2004 | Cannon et al. |
| 6,798,874 B1 | 9/2004 | Ohlinger et al. |
| 6,799,052 B2 | 9/2004 | Agness et al. |
| 6,804,334 B1 | 10/2004 | Beasley et al. |
| 6,816,469 B1 | 11/2004 | Kung et al. |
| 6,839,761 B2 | 1/2005 | Kadyk et al. |
| 6,847,715 B1 | 1/2005 | Swartz |
| 6,870,835 B1 | 3/2005 | Chen et al. |
| 6,876,734 B1 | 4/2005 | Summers et al. |
| 6,898,279 B1 | 5/2005 | Baker et al. |
| 6,905,414 B2 | 6/2005 | Danieli et al. |
| 6,907,123 B1 | 6/2005 | Schier |
| 6,912,275 B1 | 6/2005 | Kaplan |
| 6,917,672 B2 | 7/2005 | Brown et al. |
| 6,918,034 B1 | 7/2005 | Sengodan et al. |
| 6,928,558 B1 | 8/2005 | Allahwerdi et al. |
| 6,931,001 B2 | 8/2005 | Deng |
| 6,934,858 B2 | 8/2005 | Woodhill |
| 6,947,417 B2 | 9/2005 | Laursen et al. |
| 6,959,184 B1 | 10/2005 | Byers et al. |
| 6,977,993 B2 | 12/2005 | Starbuck et al. |
| 6,985,745 B2 | 1/2006 | Quaid |
| 6,987,744 B2 | 1/2006 | Harrington et al. |
| 7,042,989 B2 | 5/2006 | Lawson |
| 7,085,244 B2 * | 8/2006 | Koskelainen et al. ........ 370/261 |
| 7,139,370 B1 | 11/2006 | Tse |
| 7,189,132 B2 | 3/2007 | Nacik et al. |
| 7,275,109 B1 | 9/2007 | Lee |
| 7,333,614 B2 | 2/2008 | Jarosinski et al. |
| 7,466,801 B2 | 12/2008 | Miller et al. |
| 7,561,892 B2 * | 7/2009 | Huh et al. .................... 455/518 |
| 2002/0010008 A1 | 1/2002 | Bork et al. |
| 2002/0040936 A1 | 4/2002 | Wentker et al. |
| 2002/0068537 A1 | 6/2002 | Shim et al. |
| 2002/0086680 A1 | 7/2002 | Hunsinger |
| 2002/0098831 A1 | 7/2002 | Castell et al. |
| 2002/0140745 A1 | 10/2002 | Allenby et al. |
| 2002/0167937 A1 | 11/2002 | Goodman |
| 2002/0178228 A1 | 11/2002 | Goldberg |
| 2002/0181691 A1 | 12/2002 | Miller et al. |
| 2002/0198004 A1 | 12/2002 | Heie et al. |
| 2003/0043992 A1 | 3/2003 | Wengrovitz |
| 2003/0061496 A1 | 3/2003 | Ananda |
| 2004/0003070 A1 | 1/2004 | Fernald et al. |
| 2004/0024640 A1 | 2/2004 | Engle et al. |
| 2004/0078349 A1 | 4/2004 | Syrjala et al. |
| 2004/0121774 A1 | 6/2004 | Rajkotia et al. |
| 2004/0125802 A1 * | 7/2004 | Lillie et al. ................. 370/390 |
| 2004/0128350 A1 | 7/2004 | Topfl et al. |
| 2004/0131206 A1 | 7/2004 | Cao et al. |
| 2004/0205330 A1 | 10/2004 | Godfrey et al. |
| 2004/0248586 A1 | 12/2004 | Patel et al. |
| 2005/0022020 A1 | 1/2005 | Fremberg |
| 2005/0031110 A1 | 2/2005 | Haimovich et al. |
| 2005/0157708 A1 | 7/2005 | Chun |
| 2005/0177622 A1 | 8/2005 | Spielman et al. |
| 2005/0197110 A1 | 9/2005 | Hasan et al. |
| 2005/0212749 A1 | 9/2005 | Marvit et al. |
| 2005/0239486 A1 * | 10/2005 | D'Avello et al. ............ 455/519 |
| 2005/0272413 A1 | 12/2005 | Bourne |
| 2005/0273333 A1 | 12/2005 | Morin et al. |
| 2006/0009238 A1 * | 1/2006 | Stanco et al. ............ 455/456.2 |
| 2006/0034336 A1 | 2/2006 | Huh et al. |
| 2006/0035657 A1 * | 2/2006 | Lim .......................... 455/518 |
| 2006/0056440 A1 * | 3/2006 | Khartabil .................... 370/447 |
| 2006/0068731 A1 | 3/2006 | Seier |
| 2006/0084454 A1 * | 4/2006 | Sung et al. .................. 455/518 |
| 2006/0089131 A1 * | 4/2006 | Huang .................... 455/414.1 |
| 2006/0104218 A1 | 5/2006 | Kako |
| 2006/0105790 A1 | 5/2006 | Jin et al. |
| 2006/0116175 A1 | 6/2006 | Chu |
| 2006/0126529 A1 | 6/2006 | Hardy |
| 2006/0147002 A1 | 7/2006 | Desai et al. |
| 2006/0206454 A1 | 9/2006 | Frostall et al. |
| 2006/0223562 A1 * | 10/2006 | Mathis ....................... 455/518 |
| 2006/0239277 A1 | 10/2006 | Gallagher |
| 2007/0036322 A1 | 2/2007 | Goldman et al. |
| 2007/0037610 A1 | 2/2007 | Logan |
| 2007/0064908 A1 | 3/2007 | Levy et al. |
| 2007/0112571 A1 | 5/2007 | Thirugnana |
| 2007/0177503 A1 * | 8/2007 | Mooney et al. ............. 370/230 |

\* cited by examiner

```
<Priority-based template>
    <group>name="Fire-fighters"
        <Participant>priority="1",name="bob",talkburst-time="x"
        <\Participant>
        <Participant>priority="2",name="alice",talkburst-time="y"
        <\Participant>
    <\group>
<\Priority-based template>
```

FLOOR CONTROL TEMPLATES FOR USE IN PUSH-TO-TALK APPLICATIONS

FIELD OF THE INVENTION

The present invention relates generally to the fields of data networks and communication systems; more specifically, to mobile communication service providers that deploy push-to-talk applications for subscribers.

BACKGROUND OF THE INVENTION

Push-to-talk (PTT) is a two-way communication service that works like a walkie-talkie. A normal cell phone call is full-duplex, meaning both parties can hear each other at the same time. PTT is half-duplex, meaning communication can only travel in one direction at any given moment. A token-based model of operation, in which a person must be first granted access to the floor by a floor control mechanism before he may speak to other session participants, typically governs most PTT sessions. For instance, a PTT-enabled handset typically requires that a caller press and hold a button while talking, and then release the button when they are done. Any listener may then press their button in a similar manner to request access to the floor in order to respond.

PTT applications have been utilized in the radio and microwave communication industries for many years. A variety of different applications are ubiquitous today. For example, dispatch services such as police and fire departments, paramedic units, and security teams routinely use PTT applications for field communications. More recently, mobile service providers have begun to provide enhanced PTT services based on Internet Protocol (IP) based solutions. For instance, push-to-talk over cellular (PoC) applications are actively being pursued by mobile service providers in the Open Mobile Alliance (OMA) standards body for use in chatting with families, buddies and in certain business applications, such as dispatch services, security services and various government agencies (e.g., fire, ambulance, police, FEMA, etc.). The OMA PoC approach is based on the session initiation protocol (SIP), a widely-used signalling protocol for voice over IP (VoIP) communications in which transfer of packets is done using the real-time transport protocol (RTP). RTP is a known protocol for transmitting real-time data such as audio or video streams. The RTP control protocol (RTCP) is an associated protocol useful for maintaining RTP session quality. The talk burst control protocol (TBCP) is a known protocol that uses extension features of RTCP to invoke floor control within a PoC environment.

By way of further background, a system and method for controlling the transmission of talk bursts using a talk burst control protocol is described in U.S. Patent Publication No. 2006/0034336. A system for providing media services in voice over IP (VoIP) telephony in which audio is transmitted in packet streams such as RTP/RTCP packets is disclosed in U.S. Pat. No. 6,947,417. U.S. Pat. No. 6,044,081 teaches a communications system and multimedia system that allows private network signaling to be routed over a packet network.

One of the problems with providing enhanced PTT services is that many legacy communication systems that accommodate PTT based radio communication devices are often incompatible with each other. This can make it difficult to integrate different PTT services in situations where endpoint communication devices must share the same logical floor and arbitrate across different applications. Many times, with disparate applications there arises a need to provide different floor control characteristics applicable to these different application scenarios.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
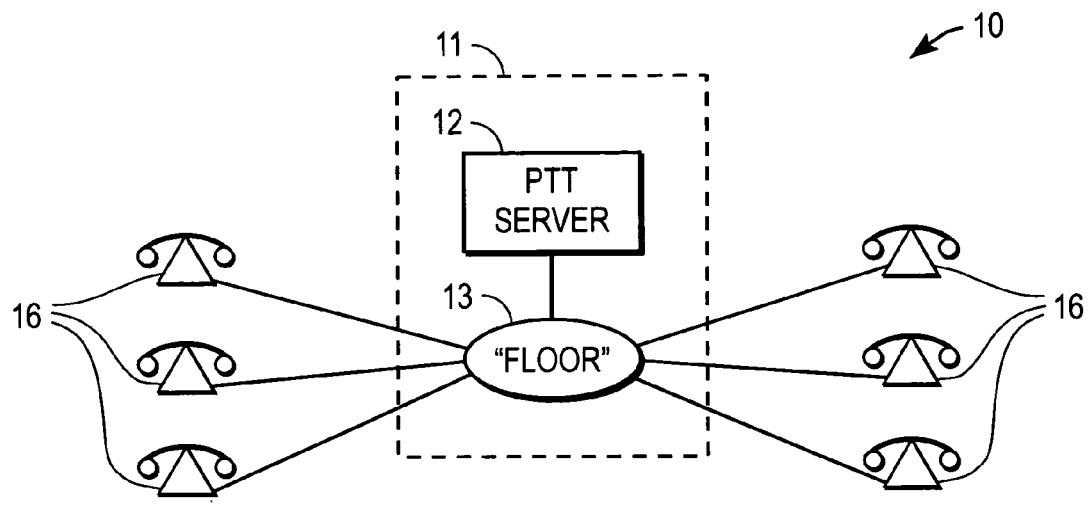
FIG. 1 is a high-level conceptual diagram of a PTT system architecture in accordance with one embodiment of the present invention.

A framework for enhanced floor control in a PTT conference session is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, a mechanism defines several different templates or algorithms for floor control for various types of PTT applications. The initiator or moderator/administrator of the PTT group session may apply any of the available templates to the current session. Different groups can have different templates applied. Each floor control template corresponds to a different floor control algorithm (thus, the terms "template" and "algorithm" are used interchangeably in context of the present application). When a group session is initiated, a first (i.e., default) floor control algorithm or template in the form of executable code is loaded and applied (i.e., the code is executed) on the PTT server(s) responsible for handling floor control for the PTT session. For example, the template code may be downloaded via a network connection, or, alternatively, fetched from a memory associated with the PTT server (s). Each template, as well as the computer-executable routine used for selecting a new floor control template, may also be embodied in a variety of different forms, e.g., software, hardware, firmware, computer program products, etc.

The initial floor control algorithm continues to apply to the PTT session until the template is switched or changed. That is, a participant, session moderator or an administrator with an appropriate privilege grant can dynamically change the template during the course of the session. Various privilege levels governing who may change the floor control template may be assigned based on the particular application. For example, in an emergency response situation application, the privilege to change the current template and apply a new floor control algorithm may only be granted to unit commanders (i.e., a police chief, a fire chief, etc.).

As will be described in more detail below, in a specific implementation, a user interface may be employed by a user/moderator/administrator to select a new floor control to be applied to the current PTT session. A graphical user interface (GUI), a telephony user interface (TUI), or a voice user interface (VUI) may be used. For example, a user may utilize an interactive voice response (IVR) system associated with the PTT server, wherein the user may press a special key code, e.g., "#9", in order to invoke a menu that allows the user to select one of a number of different floor control algorithms or templates to be applied to the current PTT session. In the case where the user is communicating via an IP phone, a special "floor control template" softkey button may display a selection menu and instantiate one or more softkey buttons allowing the user to make his selection from the menu listing. An exemplary user interface in accordance with this later embodiment is described in more detail below in connection with FIG. 6.

In yet another embodiment, a user/moderator can use a web-based or native graphical user interface (GUI) running on a personal computer (PC) to selectively change the floor control template applied to the current PTT session. The GUI may be generated by software (i.e., code) running the user's PC. In other cases, the GUI may comprise a collaborative web-based application that is accessed by the browser software running on the user's PC. In other instances, the GUI may comprise a downloaded application, or other forms of computer-executable code that may be loaded or accessed by a user's PC.

By way of example, the GUI may list the entire set of available templates, optionally including a detailed text description of the operational features offered by each template and situational examples where application of the template is most useful. When the user selects a particular floor control template for the session, the GUI outputs a signal via an external interface of the PC to the PTT server that causes the server to immediately change the floor control algorithm in use. In other words, in response to the selection of the user/moderator, the PTT server changes the way it arbitrates requests from users to talk and/or the conditions associated with the talk bursts of each participant.

Practitioners will appreciate that the present invention is not limited to any specific types of floor control algorithms or to any particular set of templates. In other words, the various types of algorithms used to control the PTT floor described below is not intended to be exclusive or exhaustive of the different types of control algorithms that may be employed. Rather, the framework and overlaying mechanism for selecting a particular template is largely independent of the particular floor control templates used to populate the list from which the user makes his selection.

In accordance with one embodiment of the present invention, when a new floor control template has been selected and applied to the current PTT session, the PTT server may notify each of the participants of the change via a brief audio tone (e.g., two short "beep" tones) or a pre-recorded message sent to their communication device. In the latter case, for example, the server may play a message (e.g., "Priority-based floor control is now in use" or "Buffered talk bursts are now in use") that provides adequate notification of the change in floor control to all persons participating in the PTT session. Depending on the capabilities of the particular endpoint devices being used, various participants may also be notified via other media channels (e.g., text messaging, or some combination of text and audio messaging).

It is appreciated that the media path for the session participants may include audio (voice) transmissions across a variety of different networks (e.g., Internet, intranet, PSTN, radio or microwave frequency communication networks, etc.), different protocols (e.g., IP, Asynchronous Transfer Mode (ATM), Point-to-Point Protocol (PPP)), with connections that span across multiple services, systems, and devices (e.g., handsets, cellphones, IP phones, softphones, emergency response communication systems, etc.). Alternative embodiments of the present invention may be implemented in PBX, telephony, telephone, and other telecommunications systems.

FIG. 1 is an architectural diagram of a system 10 in accordance with one embodiment of the present invention which includes a PTT server 12 that manages or controls a logical "floor" 13 wherein one of a plurality of participants 16 is permitted to speak at a time via corresponding endpoint devices 16. PTT server 12 and floor 13 are grouped together as a logical entity shown by dashed line 11. When a participant wishes to speak during the session he transmits, via his corresponding endpoint device 16, a talk burst request message to server 12. PTT server 12 may utilize the TBCP or some other protocol to arbitrate control of floor 13 amongst all of the participants 16 in accordance with a particular floor control algorithm. Practitioners in the arts will understand that PTT server 12 may be implemented by hardware, firmware, or software component elements that implement the various functions described herein.

A number of different floor control algorithms or templates may be designed for use in accordance with the present invention. For example, in a "Priority-based" floor control template different subscribers or participants are assigned to different weights or priority values. Participants having higher weights assigned to the name, i.e., a higher priority, therefore have a better chance to capturing the floor in an arbitration contest with another participant having a lower priority weight. By way of example, in an emergency response or natural disaster situation, a Police Chief for Fire Chief may be granted the highest priority such that he will gain access to the floor every time he wants to communicate instructions to his subordinates via the PTT group session.

Another template that may be used in accordance with the present invention is a "Barge-In" floor control algorithm. Here, the idea is to grant a specially designated person(s) permission to barge-in and capture the floor from someone else anytime they want or need to speak to the group. Typically, 911 operators, command center operators/dispatchers, and the like, are persons that might appropriately be conferred with barge-in privileges. Once the barge-in floor control template is applied—either as a general policy or as an overlapping policy on top of another floor control algorithm—any participant that has been granted barge-in privileges is free to take over the floor from anyone who already has the floor and who may be in the middle of speaking.

A "Groups-based" relative priority floor control template can be used where there are different groups of people participating. Each group can be assigned different priority levels. Groups can also be divided into sub-groups, with each of the subgroups being assigned sub-priorities. For example, as among different groups such as fire-fighters policemen, paramedics, and emergency management administrative personnel, it may be desirable to give the highest priority to the people in the field closest to the unfolding emergency situation. Thus, for example, in certain emergency or disaster scenarios it may be desirable to define the fire-fighter group as having a higher priority relative to other groups.

Figure 2:
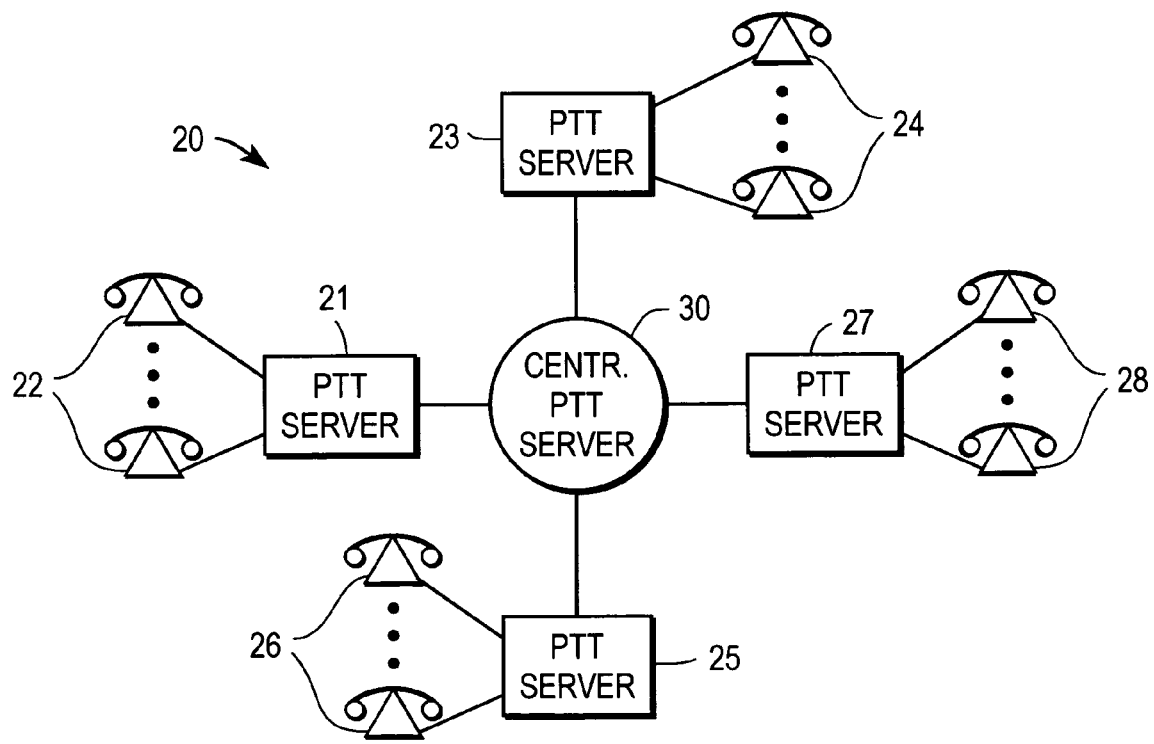
FIG. 2 is a PTT system architecture diagram in accordance with another embodiment of the present invention.

Yet another template that may be used in accordance with the present invention is a "Distributed" floor control template or algorithm. FIG. 2 illustrates a PTT system 20 with a distributed, hierarchical architecture in accordance with one embodiment of the present invention. Distributed PTT servers 21, 23, 25, and 27 are each connected to a central PTT server 30. In the example of FIG. 2, PTT server 21 is also shown connected with a group of participants 22; PTT server 23 is shown connected with a group of participants 24; PTT server 25 is connected with a group of participants 26; and PTT server 27 is connected with a group of participants 28.

In the architecture of FIG. 2, applying the distributed floor control template to PTT server 30 has the effect of distributing the floor control to each of servers 21, 23, 25, and 27. In other words, instead of having server 30 arbitrate requests from all of the groups of participants 22, 24, 26, and 28, the distributed floor control template distributes most of the arbitration among the participants so that it is done locally, i.e., before it reaches central PTT server 30, which then arbitrates the final winner. In this sense, the distributed floor control template is more of an overlay template since server 30 still arbitrates to grant the floor (according to some selected or predetermined algorithm) as among the local arbitration winners.

Persons of skill in the arts will appreciate that the distributed floor control template provides scalability and speed for large PTT groups. It also provides significant savings in bandwidth, since most of the arbitration is performed locally, rather than at central PTT server 30.

In a specific implementation, a GUI/TUI may be defined to enable different floor control templates for different groups. In other words, instead of applying a floor control template on a per session basis, the template can be applied on a per group basis, with the algorithm controlling a particular group being independent from that utilized to manage/control floor behavior in another group.

For instance, each group can be access a floor control GUI from a secure web page so that templates may be applied to that group (associated server). Alternately, a TUI can be defined to apply the different templates. For example, the TUI may connect to an interactive voice response (IVR) system server to provide various configuration parameters for changing the floor behavior. The user may be prompted by the IVR with a menu listing of different template options and respond accordingly (e.g., "Press or say '1' to select the priority-based, template; press or say '2' to select the barge-in template", and so on.). In cases where intelligent endpoint devices are used, the template can be managed directly from the endpoint device via a GUI rather than from a TUI.

Another template that can be selected and applied in accordance with the present invention is the "Buffered Talk Burst" floor control template, which basically allows an open floor. And that is, anyone is free to speak at any time. All requests are time-stamped, buffered and played out in the order that they were generated.

Still another template that can be selected and applied in accordance with the present invention is the "Round Robin Talk Burst" allocation template. In this algorithm, the floor is granted to each participant for a predetermined time burst (e.g., 5-10 seconds) in a round-robin fashion. This is typically useful for polling or introduction type situations.

A "Variable-sized Talk Burst" floor control template can be selected by a user for application in situations where it is necessary or desired to assign different individuals with different talk burst times. For instance, at times it may be important to assign a substantially longer talk burst time to a particular individual relative to other participants or subscribers to the PTT group session. For example, a person who possesses certain expert knowledge in a particular area or subject matter may be assigned a substantially longer talk burst time (e.g., 30 seconds) relative to others (e.g., 5 seconds) in order to explain something of significance to the group when he is called upon to speak or offer his expert knowledge.

Yet another example of a floor control template that may be selected by a user and applied to a PTT group session in accordance with one embodiment of the present invention is a "Weighted-Fair Queue" template. In this algorithm, floor requests that lose out (i.e., requests that are denied as part of the arbitration process, thereby resulting in the participant being unable to speak) are placed in a weighted-fair queue based on the relative priority of the losing participant (or some other weight) of each request. When the floor once again becomes available, a floor grant indication can be sent to the participant who is currently occupying the top (i.e., highest priority) position in the queue.

Figure 3:
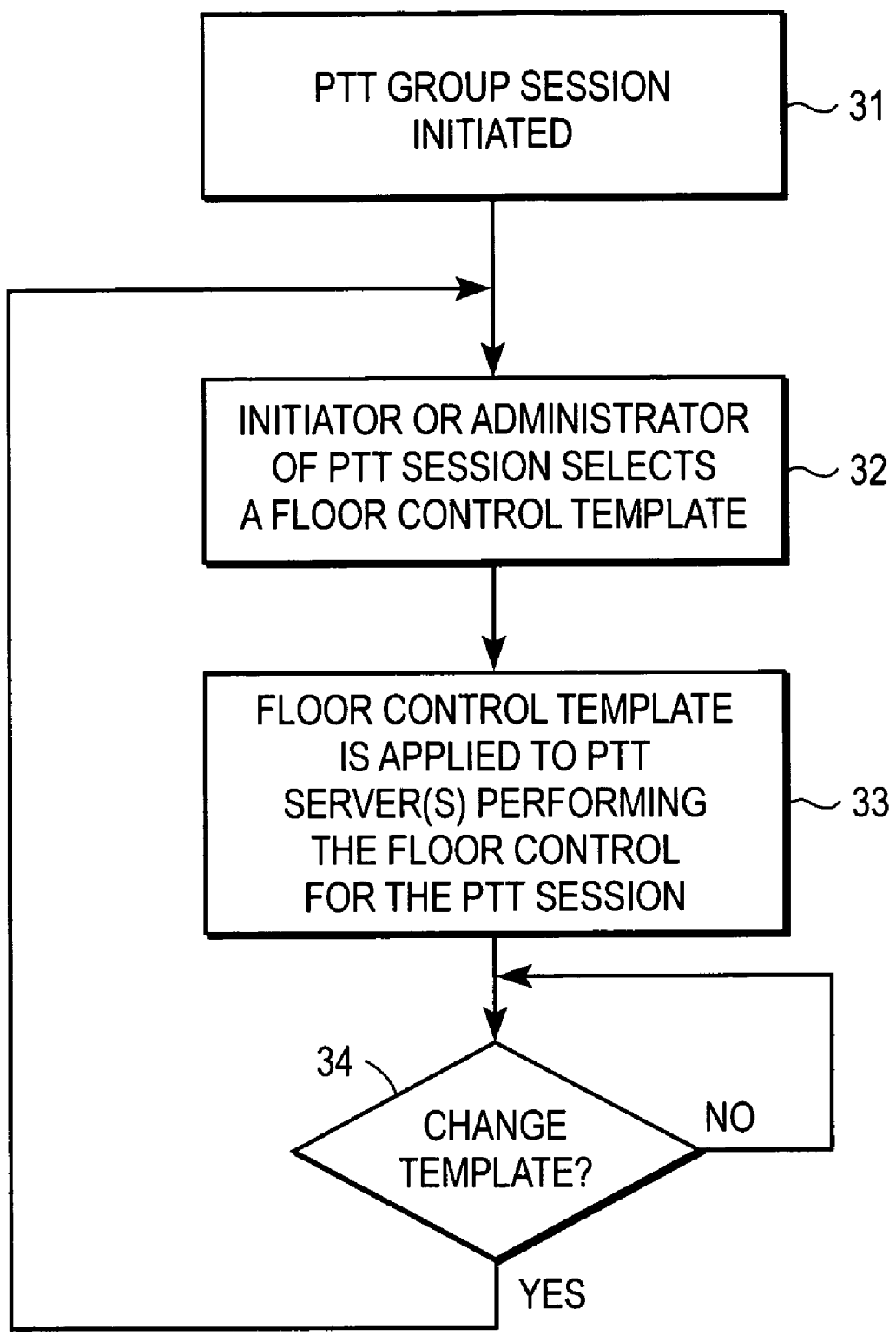
FIG. 3 is a flowchart diagram that illustrates a method of operation according to one embodiment of the present invention.

FIG. 3 is a flowchart diagram that illustrates a basic method of operation according to one embodiment of the present invention. The process begins with the PTT group session being initiated by a user, e.g., a moderator or administrator (block 31). At the time that the PTT group session is initiated, a default and floor control algorithm or template may be loaded and applied to the appropriate PTT server(s). Alternately, the user (or moderator/administrator) who initiated the PTT session may invoke a user interface (e.g., GUI or TUI) to select an initial floor control algorithm for the PTT session (block 32). Once the user has made his selection, the template is either downloaded or retrieved from memory and then applied to the PTT server performing the floor control function for the PTT group session (block 33). At any point during the PTT session the user may change the current floor control template in use via the GUI or TUI (block 34).

Note that in the embodiment of FIG. 3, there is no limitation as to the number of times that the user can change the template being applied to control the floor in the PTT session. Furthermore, in certain embodiments, more than one template may be applied at a given time to control arbitration of requests made to the PTT server. For example, in a distributed architecture with a hierarchical arrangement of PTT servers, a user may select a distributed a floor control template in order to distribute most of the arbitration to the local servers, while utilizing another template for final arbitration at the central PTT server.

It should be further understood that, in certain embodiments, selection of the particular floor control template to be applied to the PTT server may be automated, based on policy rules, particular system configurations, or other considerations. For example, the system may be configured such that for a PTT session initiated by a person associated with a certain group (e.g., fire-fighters), a priority-based template is initially applied by default. Later, if during the session, persons from other groups join in and participate in the session, the system may automatically change the template to a "Groups-based" floor control template, or some other control algorithm. If a Fire Chief or Police Chief participates in the session, a "Barge-in" template may be overlaid onto the existing floor control algorithm. In other words, changing of the templates may be automated in accordance with the changing dynamics and conditions of the PTT session as monitored and determined by the PTT server. An optional override privilege may be granted to certain users or to the session moderator/administrator to override the automatic template selection and/or disable the automatic template selection mechanism.

Figures 4, 5:
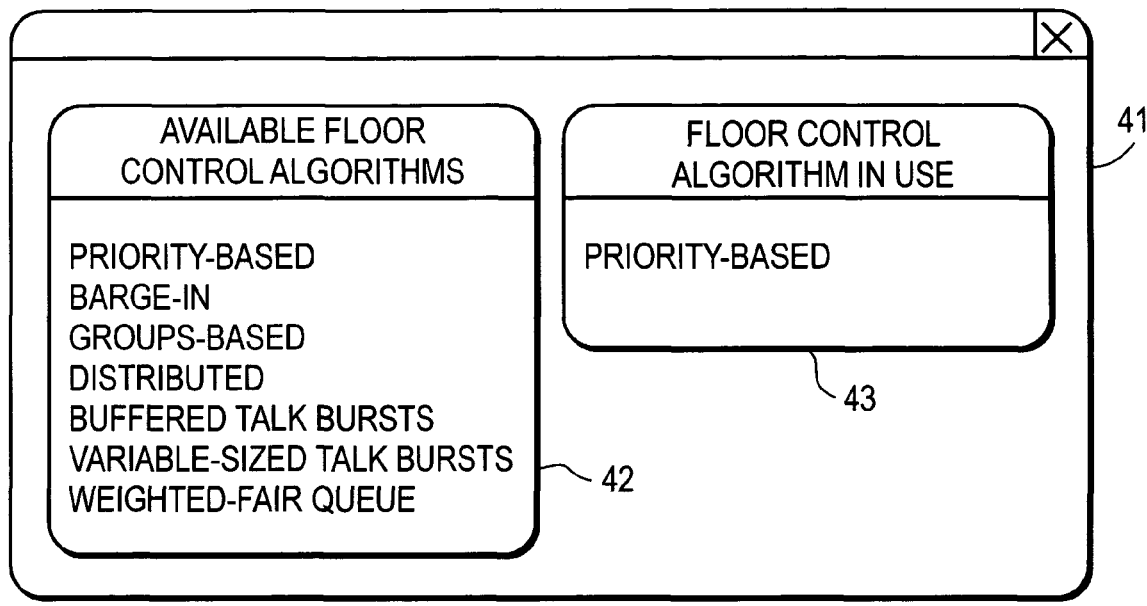
FIG. 4 illustrates a user interface window associated with an application running on a PC of a user in accordance with one embodiment of the present invention.
FIG. 5 is a meta language code listing of an exemplary template in accordance with one embodiment of the present invention.

FIG. 4 is an example that illustrates a graphical user interface (GUI) 41 associated with an application running on a PC of a moderator or participant in accordance with one embodiment of the present invention. As can be seen, GUI 41 includes respective display windows 42 and 43 that list the available floor control algorithms may be selected from and the floor control. In this example, window 42 lists seven different floor control templates that may be applied to a PTT group session (i.e., Priority-based, Barge-In, Groups-based, Distributed, Buffered Talk Bursts, Variable-Sized Talk Bursts, and Weighted-Fair Queue). The floor control algorithm currently in use (window 43) is the priority-based floor control algorithm. According to one implementation, when the user or moderator wants to change the floor control template he may do so by clicking (i.e., selecting) on one of the template names listed in window 42 and dragging/dropping it into window 43. Alternatively, the moderator may "double-click" on the template name to select that template and have it applied at the PTT server. In this latter case, "double-clicking" on a selected template results in the user interface being immediately moving that template into window 43, and moving the template name that was previously in window 43 back into the listing shown in window 42.

FIG. 5 is a meta language code listing of one possible implementation of a priority-based floor control template in accordance with one embodiment of the present invention. The example shown in FIG. 5 is a simple Extensible Mark-Up Language (XML)-based listing that defines relative priorities of two individuals (i.e., Bob and Alice) who are designated as participants in the "Fire-fighters" group. Note that in this example, Bob is assigned a priority level "1", having an associated talk burst time defined by the variable "x". Similarly, Alice is assigned a priority level "2", with an associated talk burst-time defined by the variable "y". Practitioners in the art will appreciate that the listing in FIG. 5 can easily translate into corresponding bits in the TBCP protocol (e.g., TBCP floor request message: 32 bytes=SSRC; 8 bytes=priority; 32 bytes=talk burst-time).

Figure 6:
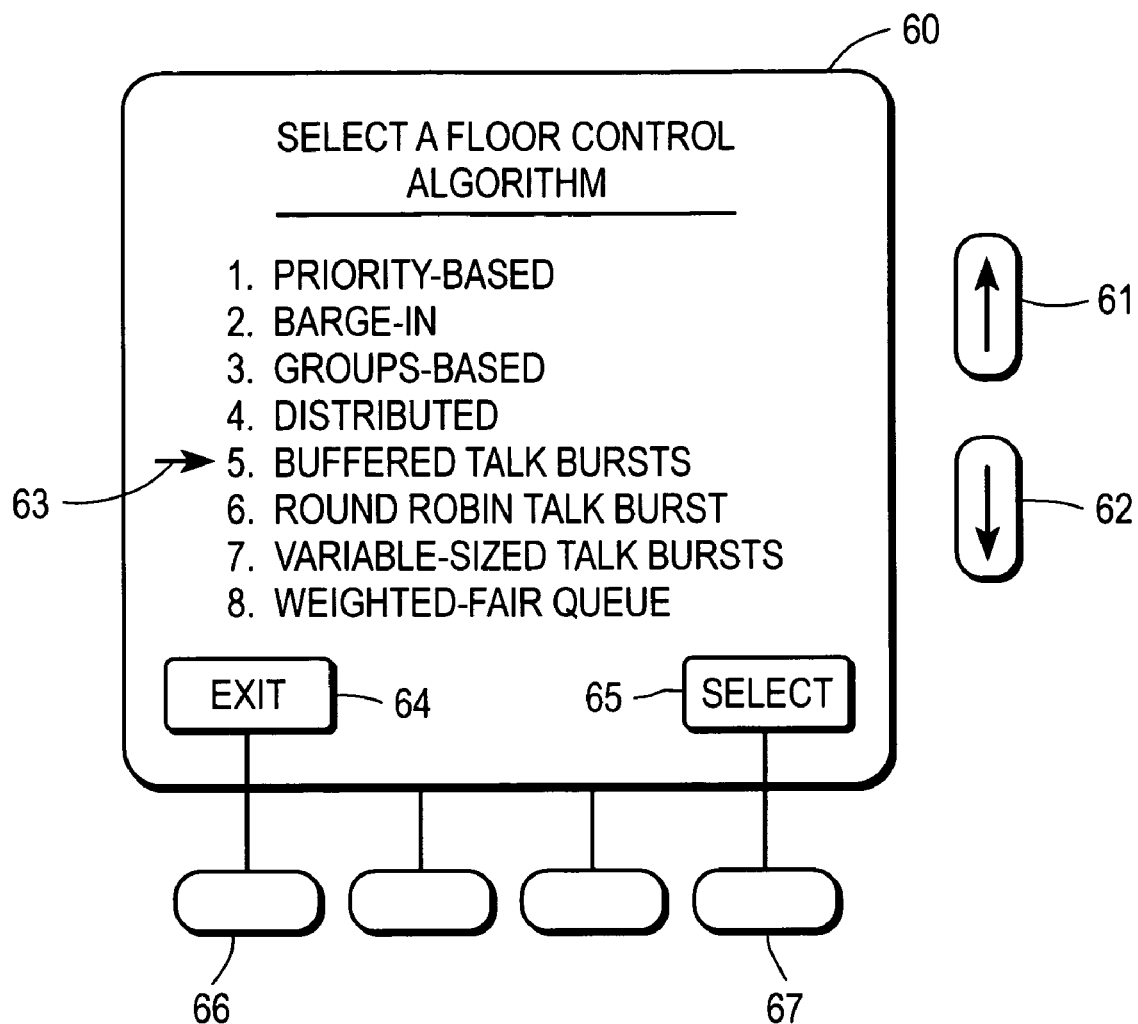
FIG. 6 illustrates a display window of a telephone device with a user interface that may be utilized to select a particular floor control template in accordance with one embodiment of the present invention.

FIG. 6 illustrates a display screen 60 of an IP phone (e.g., a VoIP phone) according to one embodiment of the present invention. Display screen 60 comprises a specialized user interface useful in displaying various floor control algorithms or templates that may be selected for use during the PTT session. The user interface shown in FIG. 6 may be generated by software (i.e., code) running on the user's phone. In this case, the IP phone may be equipped with a special "softkey" assignment button that can be used to invoke the floor control algorithm selection display screen shown. The icon for this softkey button can be instantiated once the user joins the PTT session (with appropriate moderator or administrator rights), or simply be located under a main conferencing menu on the telephone device. For example, to initiate display screen 60, which provides the user with the ability to dynamically select a particular floor control algorithm or template, the user of the IP phone can simply the press the "Floor Control" softkey button on his IP phone, resulting in the display screen 60 being presented as shown in FIG. 6.

Note that in the example of FIG. 6, the cursor arrow 63 is currently shown positioned by the "Buffered Talk Bursts" floor control algorithm. The user has the option of moving cursor arrow 63 up or down by pressing scrolling buttons 61 or 62, respectfully. A selection of a particular floor control algorithm or template may be made by pressing softkey 67, which corresponds to icon 65 ("SELECT") on display screen 60. When the user is finished making his selection, he may exit the selection screen by pressing softkey button 66, which corresponds to icon 64 ("EXIT") on display screen 60. Exiting the floor control algorithm selection display screen terminates the ability of the user to change the floor control algorithm currently in use via the user interface. The user, of course, may re-invoke the user interface at a later time during the session.

It should be understood that once a particular floor control algorithm or template has been selected, the user/moderator/administrator may change his selection as the conditions of the session change. For example, initially the person moderating a PTT session may select a "Round Robin Talk Burst" template that allows each participant to introduce himself to the other participants in attendance. Afterward, the "Buffered Talk Burst" floor control template may be selected, where any participant is free to request the floor and speak at any time. Later, if the dialogue deteriorates, e.g., due to a large number of participants trying to speak at once or if the discussions become unproductive, the moderator might appropriately select a "Priority-Based" or "Variable-Sized Talk Burst" floor control template. In other words, the user interface of FIG. 6 permits changes to the floor control algorithm on an ad hoc basis depending on current need and session communication dynamics.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A processor-implemented method of operation for managing a push-to-talk (PTT) session involving a plurality of participants, comprising:
    applying a first floor control algorithm that corresponds to a first floor control template at a PTT server, the first floor control template being selected from a plurality of floor control templates, each of which arbitrate among talk requests received from the participants; and
    during the PTT session, changing from the first floor control algorithm to a second floor control algorithm at the PPT server, the second floor control algorithm corresponding to a second floor control template;
    during the PTT session, changing from the second floor control algorithm to a third floor control algorithm applied at the PTT server, the third floor control algorithm corresponding to a third floor control template;
    wherein application of either the first or second floor control algorithm grants only one participant associated with a corresponding endpoint device permission to transmit speech from the corresponding endpoint device directly to a remaining group of the participants, endpoint devices associated with the remaining group of the participants not being permitted to transmit speech, and further wherein either the second or the third floor control algorithm comprises a distributed floor control algorithm that functions as an overlay to the first floor control algorithm, the distributed floor control algorithm distributing floor control among a plurality of servers that select local arbitration winners for corresponding groups of the participants, the PTT server selecting the one participant from the local arbitration winners.

2. The processor-implemented method of claim 1 further comprising initiating the PTT session.

3. The processor-implemented method of claim 1 wherein the either the second or third floor control algorithms includes a buffered talk burst algorithm that buffers each of the talk requests, with each request being granted in a received order.

4. The processor-implemented method of claim 1 wherein the either the second or third floor control algorithms includes a variable-sized talk burst algorithm that allows a predetermined, variable talk burst time to be assigned to each of the participants.

5. The processor-implemented method of claim 1 wherein the either the second or third floor control algorithms includes a group-based algorithm that allows a predetermined priority level to be assigned to each of a plurality of groups that the participants are associated with, a higher priority assignment providing for an increased chance of floor access in an arbitration contest.

6. The processor-implemented method of claim 1 wherein the either the second or third floor control algorithms includes a barge-in algorithm that allows a designated participant to barge-in at any time to become the one participant with permission to transmit speech.

7. The processor-implemented method of claim 1 wherein the either the second or third floor control algorithms includes a weighted-fair queue algorithm that places a denied talk request into a weighted-fair queue based on a relative priority of a losing participant associated with the denied talk request, a floor grant indication being sent to a losing participant who is at highest priority position in the weighted fair queue when the floor becomes available.

8. A computer readable memory encoded with a computer program product for conducting a push-to-talk (PTT) session involving participants associated with one or more groups, when executed, the computer program being operable to:
during the PTT session, apply a first floor control algorithm at a PTT server that arbitrates among talk requests received from the participants;
during the PTT session, apply a second floor control algorithm at the PTT server responsive to input received from a graphical user interface (GUI), the input being generated in response to selection of a first icon that corresponds to the second floor control algorithm, the selection being made by a user from a listing of available floor control algorithms presented to the user via the GUI, the second floor control algorithm comprising a distributed floor control algorithm that functions as an overlay to the first floor control algorithm, the distributed floor control algorithm distributing floor control among a plurality of servers that select local arbitration winners for corresponding groups of the participants, the PTT server selecting the one participant from the local arbitration winners;
wherein application of either the first or second floor control algorithm grants only one participant associated with a corresponding endpoint device permission to transmit speech from the corresponding endpoint device directly to a remaining group of the participants, endpoint devices associated with the remaining group of the participants not being permitted to transmit speech.

9. The computer-readable memory of claim 8, wherein execution of the computer program is further operable to initiate the PTT session.

10. The computer-readable memory of claim 8, wherein the first floor control algorithm comprises a predetermined default floor control algorithm.

11. The computer-readable memory of claim 8, wherein execution of the computer program is further operable to:
during the PTT session, change from the second floor control algorithm to a third floor control algorithm applied at the PTT server, the third floor control algorithm being applied responsive to additional input received from the GUI, the additional input being generated in response to selection of a second icon that corresponds to the third floor control algorithm.

12. The computer-readable memory of claim 8, wherein the listing of available floor control algorithms includes a buffered talk burst algorithm that buffers each of the talk requests, with each request being granted in the order received.

13. The computer-readable memory of claim 8, wherein the listing of available floor control algorithms includes a variable-sized talk burst algorithm that allows a predetermined, variable talk burst time to be assigned to each of the participants.

14. The computer-readable memory of claim 8, wherein the listing of available floor control algorithms includes a barge-in algorithm that allows a designated participant to barge-in at any time to become the one participant with permission to transmit speech.

15. The computer-readable memory of claim 8, wherein the listing of available floor control algorithms includes a weighted-fair queue algorithm that places a denied talk request into a weighted-fair queue based on a relative priority of an losing participant associated with the denied talk request, a floor grant indication being sent to a losing participant who is at highest priority position in the weighted fair queue when the floor becomes available.

16. The computer-readable memory of claim 8, wherein the listing of available floor control algorithms includes a group-based algorithm that allows a predetermined priority level to be assigned to each of the one or more groups that the participants are associated with, a higher priority assignment providing for an increased chance of floor access in an arbitration contest.

17. An Internet protocol (IP) phone operable to participate in a push-to-talk (PTT) group session via transmissions to/from a PTT server, comprising:
a display;
a plurality of softkey buttons;
a program that runs on the IP phone to produce a graphical user interface (GUI) that integrates the display and the softkey buttons such that, in one mode, at least one of the softkey buttons is operable to allow a user to select a first floor control template that corresponds to a first floor control algorithm from among a list of available floor control templates displayed on the display, selection of the first floor control template resulting in a first transmission to the PTT server that causes the PTT server to apply the first floor control algorithm to the PTT group session, the GUI further providing the user with an option to replace the first floor control algorithm with a second floor control algorithm selected from the list of available floor control templates displayed on the display, the second floor control algorithm corresponding to a second floor control template, selection of the second floor control template resulting in a second transmission to the PTT server that causes the PTT server to apply the second floor control algorithm to the PTT group session, the second floor control algorithm comprising a distributed floor control algorithm that functions as an overlay to the first floor control algorithm, the distributed floor control algorithm distributing floor control among a plurality of servers that select local arbitration winners for corresponding groups of the participants, the PTT server selecting the one participant from the local arbitration winners, and wherein application of either the first or second floor control algorithm grants only one participant associated with a corresponding endpoint device permission to transmit speech directly from the corresponding endpoint device to a remaining group of the participants, endpoint devices associated with the remaining group of the participants not being permitted to transmit speech.

18. The IP phone of claim 17, wherein in a second mode, at least one of the softkey buttons is operable to allow a user to display the list of available floor control templates on the display.

19. The IP phone of claim 17, wherein the list of available floor control templates includes a template that corresponds to a buffered talk burst algorithm that buffers each talk request received by the PTT server from a participant of the PTT group session, such that each talk request is granted in a received order.

20. The IP phone of claim 17, wherein the list of available floor control templates includes a template that corresponds to a variable-sized talk burst algorithm that allows a predetermined, variable talk burst time to be assigned to each participant to the PTT group session.

21. The IP phone of claim 17, wherein the list of available floor control templates includes a template that corresponds to a group-based algorithm that allows a predetermined, priority level to be assigned to each of a plurality of groups that participants to the PTT group session are associated with, a higher priority assignment providing for an increased chance of floor access in an arbitration contest.

22. The IP phone of claim 17, wherein the list of available floor control templates includes a template that corresponds to a weighted-fair queue algorithm that places a denied talk request into a weighted-fair queue based on a relative priority of an losing participant associated with the denied talk request, a floor grant indication being sent to a losing participant who is at highest priority position in the weighted fair queue when the floor becomes available.

23. A processor-implemented method of operation for managing a push-to-talk (PTT) group session involving a plurality of participants, comprising:

receiving, at a PTT server, input from a communication device associated with a first participant, the input being generated in response to selection of a first floor control template that corresponds to a first floor control algorithm, the selection being made by a moderator from a listing of available floor control templates presented to the moderator via a user interface;

applying, responsive to the input, the first floor control algorithm at the PTT server;

receiving, at the PTT server, additional input from the communication device associated with the first participant, the additional input being generated in response to selection of a second floor control template from the listing of available floor control templates, the second floor control template corresponding to a second floor control algorithm, the second floor control algorithm comprising a distributed floor control algorithm that functions as an overlay to the first floor control algorithm, the distributed floor control algorithm distributing floor control among a plurality of servers that select local arbitration winners for corresponding groups of the participants, the PTT server selecting the one participant from the local arbitration winners;

applying, responsive to the additional input, the second floor control algorithm at the PTT server;

wherein application of either the first or second floor control algorithm grants only one participant associated with a corresponding endpoint device permission to transmit speech to a remaining group of the participants, endpoint devices associated with the remaining group of the participants not being permitted to transmit speech.

24. The processor-implemented method of claim 23 wherein the user interface comprises a graphical user interface.

25. The processor-implemented method of claim 23 wherein the user interface comprises a telephony user interface.

26. The processor-implemented method of claim 23 wherein the second floor control algorithm includes a variable-sized talk burst algorithm that allows a predetermined, variable talk burst time to be assigned to each of the participants.

27. The processor-implemented method of claim 23 wherein the second floor control algorithm includes a group-based algorithm that allows a predetermined, priority level to be assigned to each of a plurality of groups that the participants are associated with, a higher priority assignment providing for an increased chance of obtaining the floor in an arbitration contest.

28. The processor-implemented method of claim 23 wherein the second floor control algorithm includes a buffered talk burst algorithm that buffers each of the talk requests, with each request being granted in the order received.

29. The processor-implemented method of claim 23 wherein the second floor control algorithm includes a barge-in algorithm that allows a designated participant to barge-in at any time to become the one participant with permission to transmit speech.

30. The processor-implemented method of claim 23 wherein the second floor control algorithm includes a weighted-fair queue algorithm that places a denied talk request into a weighted-fair queue based on a relative priority of a losing participant associated with the denied talk request, a floor grant indication being sent to a losing participant who is at highest priority position in the weighted fair queue when the floor becomes available.

* * * * *